Dec. 7, 1937.  E. A. THOMPSON  2,101,826
SYNCHRONIZING CLUTCH MECHANISM
Filed Nov. 9, 1935   2 Sheets-Sheet 1
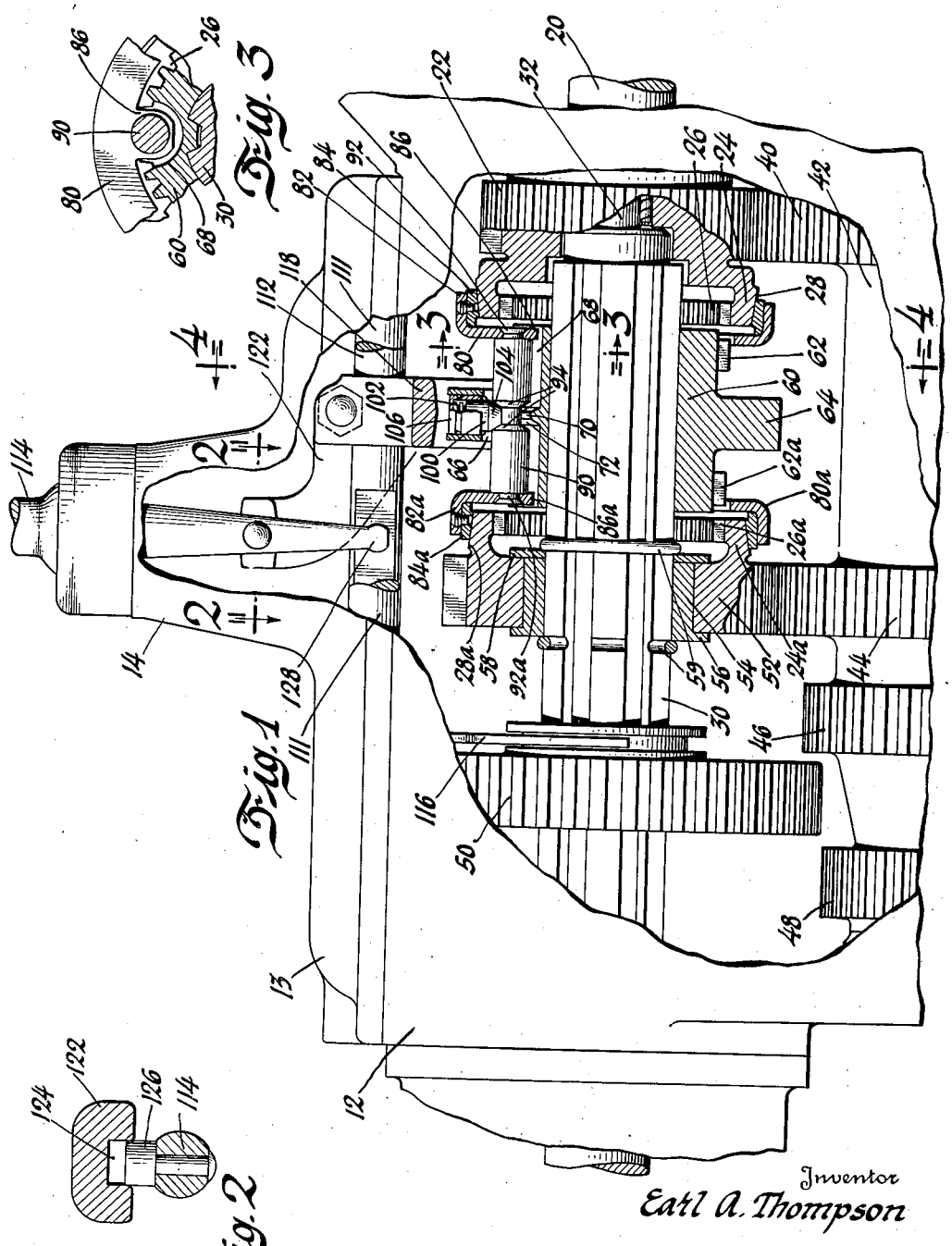
Inventor
Earl A. Thompson
By Blackmore, Spencer & Flint
Attorneys Dec. 7, 1937.  E. A. THOMPSON  2,101,826
SYNCHRONIZING CLUTCH MECHANISM
Filed Nov. 9, 1935

Inventor
Earl A. Thompson
By Blackmore, Spencer & Flint
Attorneys

Patented Dec. 7, 1937

2,101,826

UNITED STATES PATENT OFFICE 2,101,826

SYNCHRONIZING CLUTCH MECHANISM

Earl A. Thompson, Birmingham, Mich., assignor to General Motors Corporation, Detroit, Mich., a corporation of Delaware Application November 9, 1935, Serial No. 48,971

6 Claims. (Cl. 192—53)

This invention relates to synchronizing clutch mechanism associated with change-speed gearing particularly adapted for motor vehicle power transmission mechanisms.

The object is to enable toothed coupling elements to be intermeshed without clash, when changing from one gear train to another of different ratios, by first synchronizing the velocities of the elements to be intermeshed.

The invention comprises coaxial, selective, positive clutches, combined with friction clutches adapted to synchronize the velocity of the positive clutches prior to interengaging them, said clutches constituting elements of a change speed gear mechanism.

More particularly the invention comprises: Two movable friction clutch elements connected by pins, rods, bars or equivalent angularly spaced members extending parallel with the main axis of the transmission and passing through openings formed in a double-ended slidable positive coupling element, said coupling element and said spaced connecting members having cooperating checking means adapted to resist coupling of the positive clutch elements until synchronization has been effected by the friction clutch elements.

In the accompanying drawings wherein like reference characters indicate like parts throughout the several views, Fig. 1 is an elevation of a transmission casing partly broken away and exposing inclosed change gear mechanism;

Fig. 2 is a detail of the control mechanism for changing gear ratios taken on line 2—2 of Fig. 1;

Fig. 3 is a fragmentary section on line 3—3 of Fig. 1;

Figure 4:
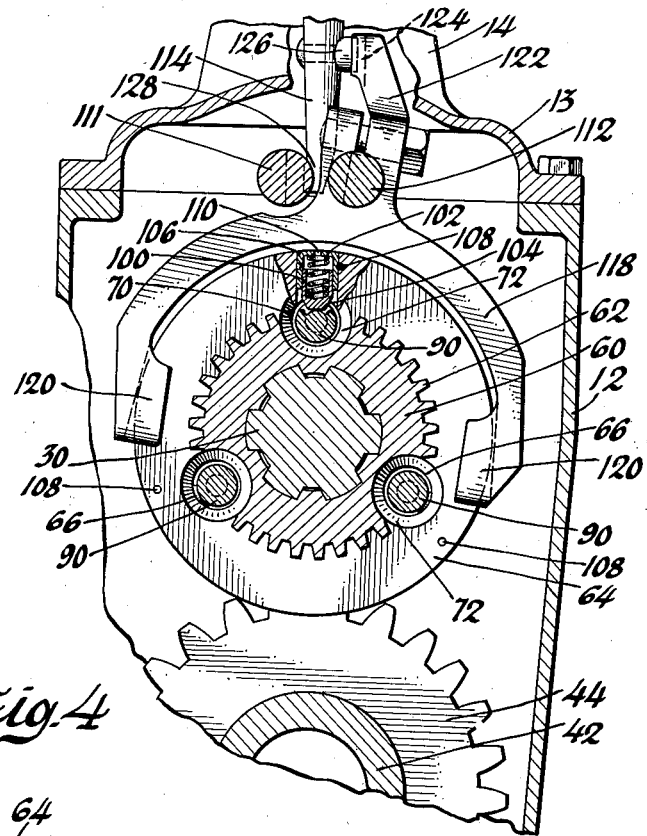
Fig. 4 is a section on line 4—4 of Fig. 1.

In the drawings numeral 12 indicates a transmission casing of a form not substantially different from those in common use in motor vehicles. The upper side of the casing is closed by a removable cover 13 having the usual hollow tower-like riser 14 in which the gear shift lever 114 is fulcrumed. The power-delivery end of the main clutch shaft 20 enters the forward end of the casing and, as usual, rotates in a bearing (not shown) in the casing. The end of the main clutch shaft 20 within the casing is equipped with the usual counter shaft driving gear 22, which has integrally or otherwise rigidly joined to its rear face an annular rearward-trending adjunct 24 carrying internal gear-like clutch teeth 26 and formed with an external conical friction clutch surface 28. The series of clutch teeth 26 constitutes with said adjunct 24 a positive clutch element and said adjunct with its conical clutch surface constitutes a friction clutch element which, as will presently appear, are combined with axially movable positive and friction clutch elements to constitute a synchronizing coupling means to couple the transmission mechanism to operate in third or high speed.

A main driven shaft 30, commonly designated the spline shaft in motor vehicle nomenclature, is disposed in axial alinement with main clutch shaft 20, which is provided with an axial bore in its rear end in which the reduced forward end 32 of the spline shaft is piloted. The rearward end of shaft 30 passes through the rear wall of the transmission casing 12 and is as usual mounted in bearings (not shown) in the casing.

Countershaft driving gear 22 meshes with a gear 40 rigid on countershaft 42, which has also rigidly connected to it, a gear 44 of the second speed train, a gear 46 of the first speed train, and a gear 48 of the reversing train. Gear 48, it will be understood, is, as usual, in mesh with a reverse-train idler gear (not shown).

A gear 50 slidably keyed on shaft 30 may be slid forward to mesh with countershaft gear 46, whereupon first speed coupling of the gear set is established through gears 22, 40, 46 and 50. Gear 50 may be slid rearward into mesh with the reverse idler whereupon reverse-drive coupling of the gear set is established through gears 22, 40, 48, reverse idler and gear 50.

Gear 52 is mounted coaxial with spline shaft 30 on a bearing member 54 secured to the shaft so as to rotate with it. Said bearing has an integral flange 56 at one end and a separable flange 58 secured at the other end. Snap rings 59 or the like prevent axial movement of the bearing member 54 on shaft 30. Flanges 56 and 58 prevent axial movement of gear 52 with respect to bearing member 54. Gear 52 is in constant mesh with countershaft gear 44, and is a part of the second speed train. It rotates freely on bearing member 54 unless locked to shaft 30 by means to be described.

Gear 52 is formed with an annular forward-reaching adjunct 24a similar to the adjunct 24 on gear 22. Adjunct 24a carries internal gear-like clutch teeth 26a and has an external conical friction surface 28a, corresponding to the elements 26 and 28 on adjunct 24 integral with gear 22.

The body of gear 52 and adjunct 24a with clutch teeth 26a and external friction cone 28a constitute one-half of a synchronizing coupling means to establish the transmission in second speed ratio.

In order to lock shaft 30 either to the main clutch shaft 20 for direct, high speed driving, or to the gear 52 for second speed driving, a positive coupling element 60 is slidably keyed to shaft 30 between the gears 22 and 52. Coupling element 60 has external gear-like clutch teeth 62 at its forward end adapted to interlock with the internal gear-like clutch teeth 26 on the part 24 rigid with gear 22. External gear-like clutch teeth 62a on its rearward end are adapted to interlock with internal gear-like clutch teeth 26a on part 24a rigid with gear 52. When coupling element 60 is moved forward teeth 62 interlock with teeth 26 with the result that shaft 30 is locked to the gear 22 and main clutch shaft 20 to couple the transmission in third speed. When coupling element 60 is moved rearward teeth 62a interlock with teeth 26a with the result that gear 52 becomes locked to shaft 30 so that the transmission is coupled in second speed.

Coupling element 60 is formed midway between its ends with a radially extending circumferential flange 64. Longitudinal openings spaced (in the form of the invention illustrated) 120° apart, extend from end to end. These openings consist of preferably round holes 66 in the region of the flange 64 and grooves 68 in the body of element 60 coaxial with the holes. Between the ends of the openings where the grooves become merged in the holes are annular ribs 70 with beveled sides 72 so that the ribs 70 taper from base to crown in radial section. The holes 66 therefore are countersunk and have conical entrances on both sides of a plane normal to the axis and passing through the rib 70.

By reason of the interruptions in circumferential continuity due to grooves 68, the external clutch teeth 62 and 62a occur in three groups equi-angularly spaced as shown in Fig. 4.

Cooperating with the conical friction surface 28 of annular adjunct 24 rigid with gear 22 is an annular drum or cupped friction clutch element 80 having secured within its flange 82 an internally coned friction ring 84 adapted to be engaged with the conical surface 28 on adjunct 24 integral with gear 22. Another similar drum or cupped friction clutch element 80a carries secured within its flange 82a, a similar friction ring 84a adapted to engage over the conical surface 28a on part 24a of gear 52. Each cupped friction clutch element 80 and 80a is of ring-like form and composed of flanges at right angles one to the other and with tongues 86 and 86a extending radially inward at angularly separated regions corresponding to the positions of grooves 68 in positive coupling element 60 and reaching into said grooves. The drums or friction clutch elements 80 and 80a are united rigidly so as to move as one body by pins, bars, rods or the like 90 fixed at the front ends to tongues 86, at their rear ends to tongues 86a. In the embodiment illustrated the ends of the pins 90 are shown as riveted to the tongues as indicated at 92 and 92a. Pins 90 are preferably round in cross section. Between its ends each pin is reduced in diameter to form spaced shoulders preferably beveled as shown at 94 at an angle to the axis that is substantially the same as that of the bevel surfaces 72 on the sides of ribs 70 which bound the central portion of holes 66 in positive coupling element 60. The reduced central portions of pins 90 are so disposed with respect to the ribs 70, bounding the holes 66 in positive coupling element 60, that the center planes of said ribs, respectively, are equally spaced from the beveled shoulders 94 on the respective pins, when the transmission is in neutral with respect to second and third speeds.

The friction clutch elements 80, 80a with their connecting pins are capable of very slight endwise movement, merely sufficient to squeeze out the oil film present when second and third trains are in neutral, as illustrated in Fig. 1, and on which film of oil the elements ride without substantial friction under these conditions, and are also capable of a limited angular movement relative to 15 coupling element 60, as permitted by the differences in diameter of the grooved portion of pins 90 and of the holes 66.

The friction clutch elements are normally centered or brought to and retained in neutral position when coupling element 60 is in neutral by the elastic force of plungers 100, which are urged radially inward by coil springs 102, since the ends of said plungers are conoidal as indicated at 104 and are of a size and contour to fit neatly between the beveled shoulders 94 on pins or rods 90. Plungers 100 slide in inverted cylindrical cups 106 fitted into radial holes drilled into the flange 64 of slidable coupling element 60 and opening into the holes 66 at right angles to the axes of the latter. Each cup is keyed in place by a pin or key 108 and each has a vent hole at 110 to permit free movement of the plungers.

The control mechanism shown in Figs. 1 and 4 comprises two shifter rails or bars 111 and 112 that can be selectively operated in a known manner by the manipulation of shift lever 114. In this form of control a yoke 116 (Fig. 1) slidable with rail 111 engages a circumferential groove in a hub formed on gear 50 and may slide the latter into mesh with countershaft gear 46 to connect the first speed train with the shaft 20, or into mesh with the reverse idler for reverse driving.

A yoke 118 is mounted on rail 112. Yoke 118 is equipped with grooved shoes 120 each shaped to embrace the rim of flange 64. The shoes are disposed at opposite ends of a diameter of said flange 64 in order to apply balanced pressure to slide the coupling element 60 so as to move its teeth into and out of engagement with the clutch teeth 26 or 26a. A curved arm 122 on yoke 118 extends rearward and upward above the rail 112 and its end is grooved vertically, as indicated at 124 in Fig. 2, to receive the lug or stud 126 fixed to shift lever 114 between the fulcrum of this lever and the lower end 128 in substantial accordance with patent to P. L. Tenney No. 1,886,850, November 8, 1932.

By moving the shift lever 114 sidewise so that its lower end 128 becomes engaged with the usual notch provided for the purpose in the inner side of rail 111 a shift may be made from neutral to first speed or to reverse. By moving the shift lever sidewise in the opposite sense the stud 126 may be caused to engage in the slot 124 of arm 122 and the coupling element 60 may be slid forward to engage clutch teeth 26 and thereby couple the transmission in third speed or high, or the coupling element 60 may be slid rearward into engagement with teeth 26a and thereby bring into operative condition the second speed train.

Figures 5, 6:
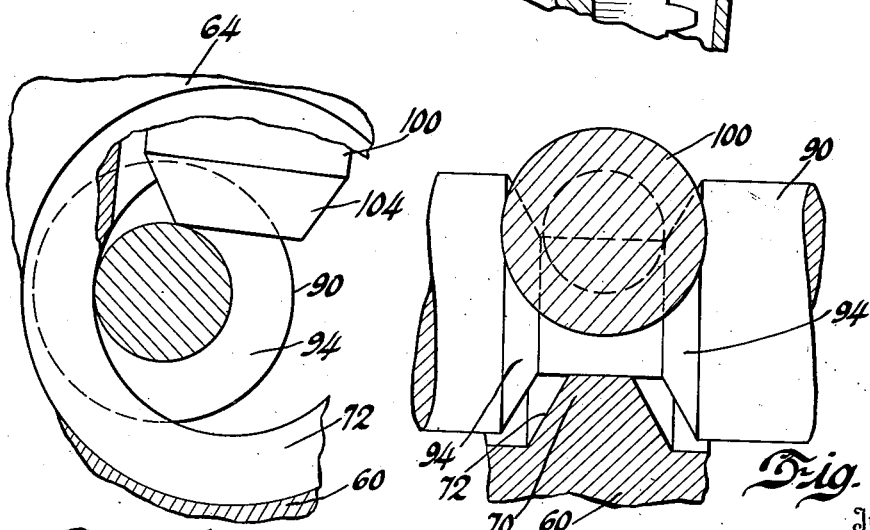
Fig. 5 is a diagrammatic view of one pair of checking elements in transverse section.
Fig. 6 is a diagrammatic view of the elements shown in Fig. 5, but in longitudinal instead of transverse section.

As the yoke 118 moves forward the spring pressed plungers 100 move the pins or bars 90, and the friction clutch drums 80, 80a, forward with a force sufficient to produce enough pressure between the internally-conical surfaced friction ring 84 and the externally conical surface 28 on gear 22 to cause a light frictional coupling sufficient, if there is a difference of speed between gear 22 and shaft 30, to move the clutch drums angularly in one sense or the other, until the beveled surfaces 72 on the coupling element 60 and the beveled shoulders 94 on the rods 90 are in alinement as shown in Figs. 5 and 6. Then continued pressure upon the shift lever tends to force the friction surfaces together more tightly thus increasing the tendency to equalize the velocities of gear 22 and shaft 30. And when these velocities are equalized the resistance caused by inertia of the differentially rotating parts disappears and the teeth 26 and 62 may be intermeshed without clashing. A similar action takes place when yoke 118 is moved rearward to couple the second speed train.

Synchronizing mechanisms of this type operate on the principle of the Albert Patent No. 1,866,614, patented July 12, 1932. They are sometimes known as "inertia check" synchronizers because of the resistance to meshing of the positive clutch elements interposed by the friction clutch elements through the inclined checking surfaces such as 72 and 94, which oppose a resistance to axial movement of the axially movable positive clutch element proportional to the difference in speed of the parts to be coupled. The spring-pressed plunger 100 functions as a priming or "cocking" device, since it insures alinement of the checking surfaces as soon as the slidable positive coupling element begins a movement to interlock with its companion, as disclosed in Tyler patent, Reissue No. 18,319, January 5, 1932.

I claim:

1. In variable speed power transmission mechanism, the combination of a shaft; axially spaced and axially fixed positive clutch elements capable of rotation independently of said shaft around the axis thereof; a positive coupling element slidably keyed to said shaft and adapted to be interlocked selectively with either of said axially fixed positive clutch elements, said slidable coupling element having openings parallel with the axis of the shaft; friction clutch elements rigid with said axially fixed positive clutch elements; axially movable friction clutch elements arranged to cooperate with said axially fixed friction clutch elements; pins rigidly connecting said axially movable friction clutch elements, said pins extending through the openings in the slidable positive coupling element each pin having spaced checking shoulders for cooperating with the edges of said openings, the cross-sectional dimensions of the pins between the spaced checking shoulders being less than that of the openings in the slidable positive coupling element.

2. The mechanism defined in claim 1 in combination with elastic yieldable means arranged to temporarily connect the slidable positive element with the axially movable friction clutch elements.

3. The mechanism defined in claim 1 in combination with elastic yieldable means carried by the slidable positive coupling element and yieldably engaging said pins between the spaced checking shoulders to temporarily connect the slidable positive coupling element with the axially movable friction clutch elements.

4. Variable speed power transmission mechanism as defined in claim 1, wherein the openings in the slidable positive coupling element comprise round holes with conical countersinks at each end and the checking shoulders on the pins have beveled surfaces opposed one to the other.

5. Variable speed power transmission mechanism as defined in claim 1, wherein the openings in the slidable positive coupling element comprise round holes with conical countersinks at each end and the checking shoulders on the pins have beveled surfaces opposed one to the other, in combination with spring pressed plungers mounted in the slidable coupling element, said plungers having conical ends adapted to yieldably engage the pins of the axially movable friction clutch elements between the beveled shoulders.

6. Variable speed power transmission mechanism as defined in claim 1 in which the positive coupling element slidably keyed to the shaft is provided at each end with a group of clutch teeth and with a circumferential flange disposed between the groups of clutch teeth, said openings through which the pins connecting said axially movable friction clutch elements pass being in the flange.

EARL A. THOMPSON.